Aug. 4, 1959 G. H. SCOTT 2,897,604
DEMONSTRATION ACCESSORY FOR VACUUM CLEANERS
Filed Feb. 20, 1957 2 Sheets-Sheet 1

INVENTOR.
GEORGE H. SCOTT
BY *Evans & Pearne*
ATTORNEYS

Aug. 4, 1959 G. H. SCOTT 2,897,604
DEMONSTRATION ACCESSORY FOR VACUUM CLEANERS
Filed Feb. 20, 1957 2 Sheets-Sheet 2

INVENTOR.
GEORGE H. SCOTT
BY Evans & Pearne
ATTORNEYS

United States Patent Office 2,897,604
Patented Aug. 4, 1959

2,897,604

DEMONSTRATION ACCESSORY FOR VACUUM CLEANERS

George H. Scott, Lakewood, Ohio, assignor to The Scott & Fetzer Company, Cleveland, Ohio, a corporation of Ohio Application February 20, 1957, Serial No. 641,356

2 Claims. (Cl. 35—13)

The present invention relates to vacuum cleaner accessories and particularly to accessories for demonstrating the cleaning effectiveness of vacuum cleaners to prospective purchasers at retail establishments or on door-to-door calls.

Forceful and persuasive demonstrations are presently accomplished by the provision of a demonstration dirt trap which is an accessory for the cleaner and which is temporarily substituted for the dust collector bag associated with the cleaner. The dust collector bag is removed from the cleaner exhaust and the accessory is attached thereto. The accessory is constructed so as to provide a filter member and an observation glass which are disposed in spaced relation. Thus, the cleaner can be operated and the prospective purchaser can observe, through the observation glass, the considerable amount of dirt and lint which is picked up by the cleaner during even a relatively short period of operation, since the dirt and lint are caught on the filter member and become visible as black or dark deposits.

An object of the present invention is to dramatize the demonstration of cleaning effectiveness by causing the deposit to form itself on the uncovered and exposed surface of the filter member in such a way as to convey a sales message, for example, the brand name of the machine being demonstrated. Since during demonstrations the focal point of interest and attention of observers is the surface of the filter member, the impact of a sales message which appears thereon is considerable.

A feature of the invention is the provision of a support for the filter member, which support has a filter-member-contacting surface which is shaped to define an intelligence-conveying image, the filter member shielding the image from observation through the observation glass until the image is developed by actuation of the vacuum cleaner with which the demonstration accessory is associated.

An embodiment of the invention is described below and in the accompanying drawings. This particular embodiment of the invention is described by way of example and constitutes a presently preferred form of the invention. In the drawings:

Figure 1 is a plan view of a suction cleaner showing the collector bag removed and a demonstration dirt trap attached to the exhaust of the cleaner. A fresh filter member has been inserted in the dirt trap. The plan view is taken from immediately above the vacuum cleaner and, therefore, the majority of the vacuum cleaner handle is not seen.

Figure 1:
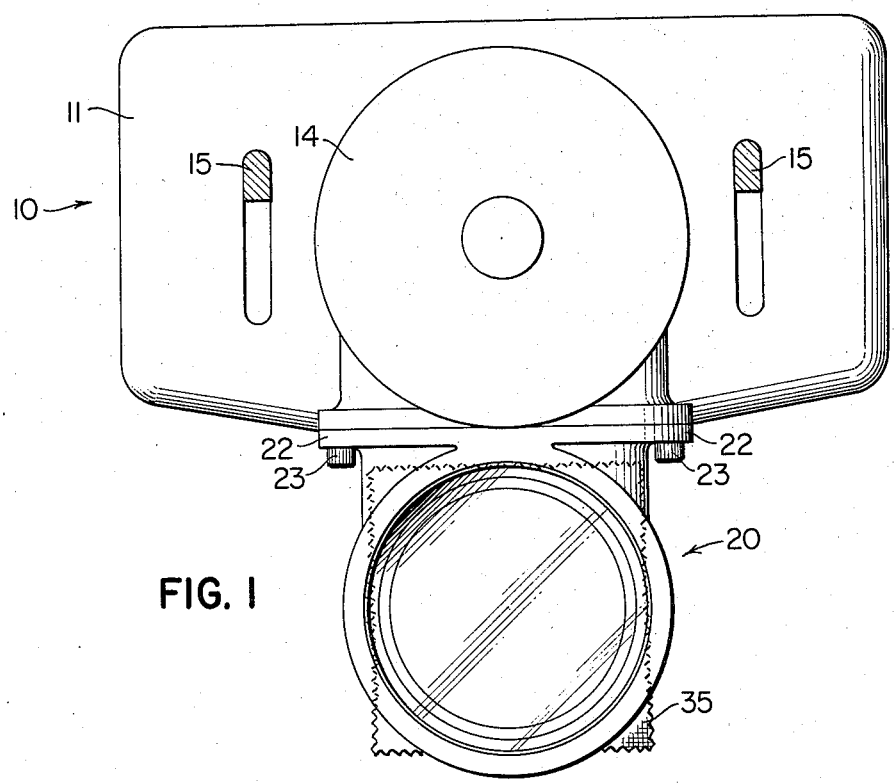

Shown in the drawings is a vacuum cleaner 10 provided with a casing 11 having a nozzle on the underside thereof which communicates through a fan chamber with an exhaust passageway 12 in the usual manner. The exhaust passageway 12 discharges into the usual collector bag, not shown, which is removably supported at the rear of the cleaner casing. A motor housing 14 is secured to the casing 11 and encloses a motor to power the vacuum cleaner fan to dislodge dirt-laden air from the surface being cleaned and discharge it through the exhaust passageway 12. The vacuum cleaner is supported on wheels (not shown) in the usual manner and is pushed over the floor covering by means of the handle 15, only the lower yoke portion of which is seen in Figure 1.

It should be apparent that all or many of the above details are incidental to the present invention. They are set forth so that one example of the present invention may be here disclosed in association with the kinds of structural elements with which it may typically be associated in actual practice.

The demonstration dirt trap comprises a hollow body generally indicated by the reference numeral 20. This body may be in the form of a member having a circular side wall, as shown. Extending from one section of the side wall is a mounting extension which terminates in a flange 22, which is adapted to be affixed to the flange 13 by suitable means such as the bolts 23 which may be the same bolts employed to fix the collector bag to the rear of the cleaner casing. The mounting extension is hollow and defines a passage 24 which communicates between the exhaust passageway 12 and the demonstration chamber of the hollow body 20. This chamber is designated by the reference numeral 25.

Figure 2:
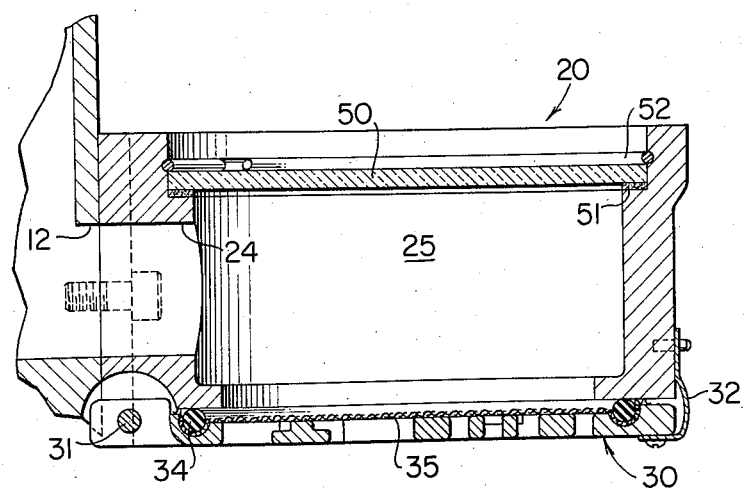
Figure 2 is a sectional view through the center of the demonstration dirt trap.
Figure 3:
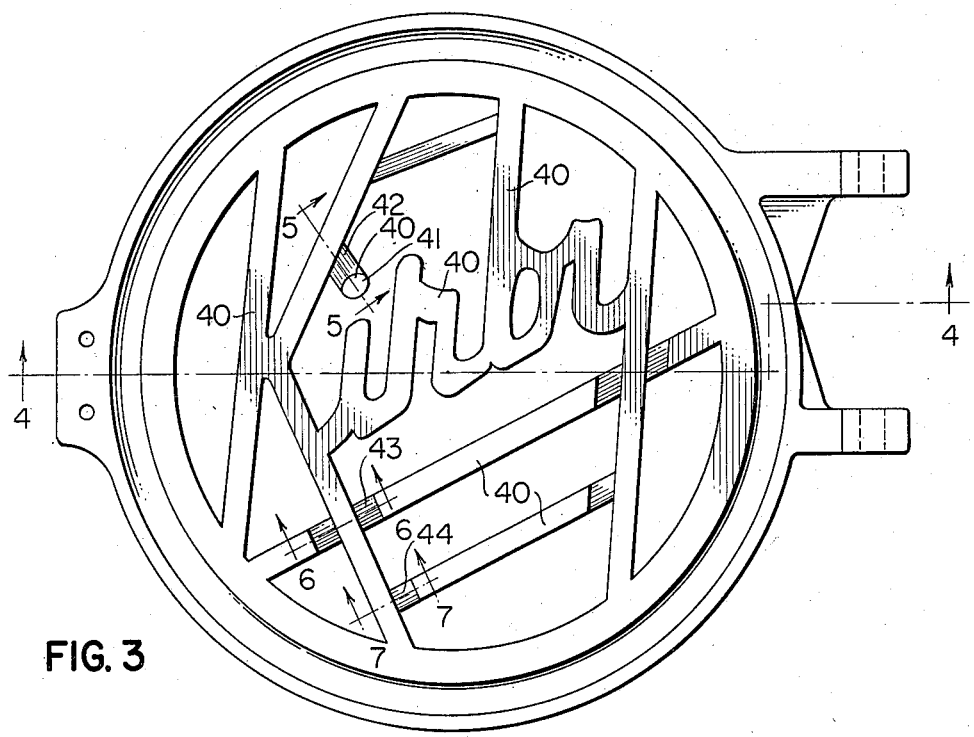
Figure 3 is a plan view of the hinged filter-member-supporting means which is incorporated in the demonstration dirt trap, illustrated in Figures 1 and 2.
Figure 4:
Figures 4–7 are sectional views taken on lines 4—4, 5—5, 6—6, and 7—7, respectively, in Figure 3.
Figure 8:
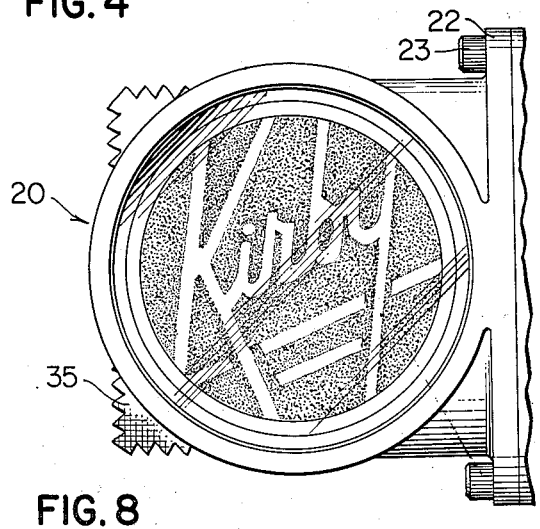
Figure 8 is a view similar to Figure 1 showing the condition of the demonstrator after brief operation of the cleaner with which it has been associated.
Figure 5:

Hingedly mounted on the hollow body 20 at the bottom of the demonstration chamber 25 is a supporting member for the filtering means to be employed in the invention. The supporting member is generally designated by the reference numeral 30. This member is hinged to the body 20 at 31 and is held in closed position by a releasable spring latch 32. It will be apparent that the arrangement of the parts is such that the supporting member 30 can be released and swung downwardly from the hollow body 20 to enable filter members to be removed from the supporting member 30 and replaced with fresh filter members. The supporting member 30 may be provided with an annular groove 33 (Figure 4) which receives an anchor ring 34 (Figure 2). Between the anchor ring and the supporting member is releasably clamped the filter member 35 which may comprise lintine or other suitable air permeable dirt-filtering material which comprises a fibrous web of fabric or the like. Parts of the filter member 35 may protrude as indicated in Figure 1.

Figure 6:
Figure 7:

As seen in Figures 3–7, the supporting member 30 is formed to provide a filter-member-contacting face 40 which defines an intelligence-conveying image. It is to be observed that the filter-member-contacting face 40 may be discontinuous. Thus, as illustrated, isolated areas such as the island 41 may be provided, such areas being supported by suitable structure which does not contact the filter member when it is in position, such as the small supporting bridge 42. Other similar supporting bridges 43 and 44 are seen in Figures 6 and 7.

The several portions of the face 40 and the isolated areas thereof, all lie on a common surface which preferably is regular and most preferably is planar, as in the illustrated example.

At least part of the hollow body walls comprise a transparent observation area. In the present example of the invention, the hollow body 30 is provided at its top with a transparent observation window 50 which may rest on a sealing gasket 51 and be held in place by a spring-retaining member 52.

When the cleaning effectiveness of a vacuum cleaner is to be demonstrated the demonstration dirt trap is attached thereto and provided with a fresh filter member. The vacuum cleaner is then operated and the prospective purchaser is invited to observe the removal of dirt from the rug as evidenced by rapid darkening of the filter member. As he observes the filter member it indeed is quickly darkened with filtered-out dust and dirt and moreover a sales message, such as the brand name of the vacuum cleaner, is developed on the previously blank surface of the filter member. Under the circumstances this sales message carries considerable impact.

The demonstrator device can be prepared for succeeding demonstrations by releasing the latch 32, dropping the member 30, replacing the filter member with a fresh, clean filter member and repositioning the member 30 in closed position.

The features of the described example of the invention are not all necessary to the invention. The scope of the invention is defined in the following claims:

What is claimed is:

1. An accessory for demonstrating the cleaning effectiveness of a vacuum cleaner and simultaneously imparting a sales message, comprising a hollow body, the walls of which define a demonstration chamber, at least a portion of said walls comprising a transparent observation area, means for connecting the hollow body to the exhaust passageway of a vacuum cleaner for establishing communication between the exhaust passageway and the demonstration chamber, a discharge aperture opening from said demonstration chamber to the exterior thereof, an air permeable dirt filter removably supported in said discharge aperture, a supporting member for establishing such removable support, said member contacting the downstream side of said filter and comprising a filter-member-contacting face, the various portions of which lie on a common geometrical surface, said face being hidden by said filter from view through said transparent observation area, said face defining an intelligence-conveying image, said image being developable to view through said transparent observation area by operation of a vacuum cleaner with which the demonstration accessory has been associated.

2. A demonstration accessory as defined in claim 1 in which said geometrical surface on which the various portions of the filter-member-contacting face lie constitutes a plane, said transparent observation area comprising an observation window spaced over said discharge aperture and looking down thereon.

References Cited in the file of this patent

UNITED STATES PATENTS

| | | |
|---|---|---|
| 2,046,636 | Kitto | July 7, 1936 |
| 2,112,304 | Rhed | Mar. 29, 1938 |
| 2,184,406 | Troxler | Dec. 26, 1939 |
| 2,184,433 | Reed | Dec. 26, 1939 |
| 2,467,652 | Beede | Apr. 19, 1949 |
| 2,613,454 | White | Oct. 14, 1952 |